(12) United States Patent
Kushida

(10) Patent No.: US 8,476,349 B2
(45) Date of Patent: Jul. 2, 2013

(54) RUBBER COMPOSITION FOR TIRE

(75) Inventor: Naoki Kushida, Kanagawa (JP)

(73) Assignee: The Yokohama Rubber Company, Limited, Tokyo (JP)

( * ) Notice: Subject to any disclaimer, the term of this patent is extended or adjusted under 35 U.S.C. 154(b) by 17 days.

(21) Appl. No.: 13/152,461

(22) Filed: Jun. 3, 2011

(65) Prior Publication Data
US 2011/0301280 A1    Dec. 8, 2011

(30) Foreign Application Priority Data

Jun. 4, 2010    (JP) ................................ 2010-128431

(51) Int. Cl.
*C08K 5/24*    (2006.01)
(52) U.S. Cl.
USPC ........... 524/262; 524/155; 524/183; 524/492; 524/495
(58) Field of Classification Search
USPC .................... 524/183, 155, 262, 492, 495
See application file for complete search history.

(56) References Cited

U.S. PATENT DOCUMENTS

| | | | |
|---|---|---|---|
| 7,569,639 B2 * | 8/2009 | Choi et al. ................. | 525/189 |
| 2010/0099796 A1 * | 4/2010 | Lopitaux et al. .............. | 523/156 |
| 2010/0144946 A1 * | 6/2010 | Costantini et al. ........... | 524/432 |

FOREIGN PATENT DOCUMENTS

| | | |
|---|---|---|
| DE | 101 60 184 A1 | 9/2002 |
| DE | 10 2008 037 838 A1 | 3/2009 |
| EP | 1 674 521 A1 | 6/2006 |
| JP | 9-309978 A | 12/1997 |
| JP | 2007-92086 A | 4/2007 |
| JP | 2007-99872 A | 4/2007 |

OTHER PUBLICATIONS

"Carbon Black", Astlett Rubber Inc. (2012).*
German Office Action for the Application No. 10 2011 076 916.1 from German Patent Office dated Aug. 6, 2012.

* cited by examiner

*Primary Examiner* — Edward Cain
(74) *Attorney, Agent, or Firm* — Cheng Law Group, PLLC

(57) ABSTRACT

A rubber composition for a tire is blended with diene-based rubber containing 50 wt % or more of SBR, and 0.2 to 5 parts by weight of cyclic polysulfide represented by the below formula (I), 1 to 30 parts by weight of aromatic denatured terpene resin, 20 to 80 parts by weight of silica, and 40 to 100 parts by weight of carbon black relative to 100 parts by weight of the diene-based rubber. Further, a total blending amount of the silica and the carbon black is 70 to 130 parts by weight.

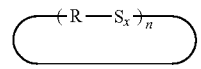

In the formula, R represents a substituted or unsubstituted alkylene group having 2 to 18 carbon atoms, a substituted or unsubstituted oxyalkylene group having 2 to 18 carbon atoms, or an alkylene group including an aromatic ring, x represents an average number of 2 to 6, and n represents an integer of 1 to 15.

4 Claims, 1 Drawing Sheet

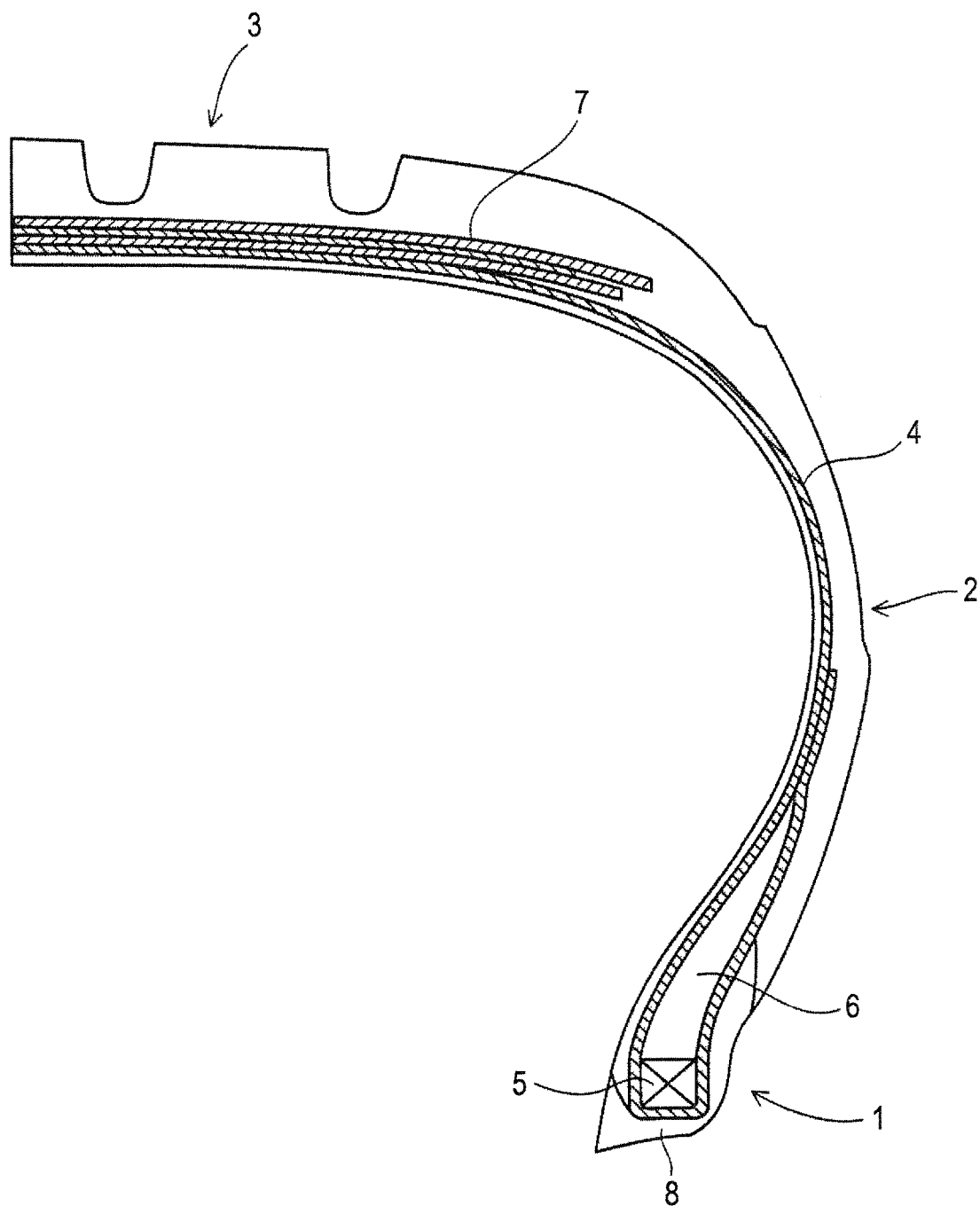

RUBBER COMPOSITION FOR TIRE

CROSS-REFERENCE TO RELATED APPLICATION

This application is based on Japanese Patent Application No. 2010-128431 filed with the Japan Patent Office on Jun. 4, 2010, the entire content of which is hereby incorporated by reference.

BACKGROUND

1. Technical Field

One aspect of the present invention relates to a rubber composition for a tire. More particularly, one aspect of the present invention relates to a rubber composition for a tire imparted with a steering stability during high-speed traveling, a wet performance, a sustainability of a grip performance, a wear resistance, and a low rolling resistance, which surpass the conventional levels.

2. Related Art

There are a variety of performances required for a pneumatic tire for a high-performance automobile. Particularly required performances include an excellent steering stability during high-speed traveling, stability on a wet road surface (wet performance), wear resistance, and reduction of rolling resistance in order to improve a fuel consumption performance. Moreover, it is also required to enable inhibition of a change in tire performance (thermal degradation) even when travelling at high speed for a long period of time on Autobahn or around a circuit, and to excel at blow-out resistance.

Examples of conventionally known technologies to improve the steering stability during high-speed traveling or the wet performance include: to blend styrene-butadiene rubber having a high glass transition temperature with a rubber composition for a tire configuring a tread portion of a pneumatic tire; and to increase the blending amount of the carbon black or silica in the rubber composition for a tire. However, these technologies have the following problems: the rolling resistance decreases with an increase in amount of the carbon black. Moreover, when an amount of the silica is increased, the wear resistance decreases. Further, when the total amount of the carbon black and the silica is increased, the sustainability of a grip performance during high-speed travelling decreases. This leads to another problem that the tire tends to experience the performance degradation due to heat, and thus, the blow-out resistance further decreases.

Therefore, JP-A-2007-92086 proposes a tire tread rubber composition containing diene-based rubber with which cyclic polysulfide is blended. The rubber composition has had slightly improved steering stability, wet performance, sustainability of a grip performance, and low rolling resistance. However, the level of improvements does not satisfy the level required for a high-performance tire. Therefore, there is still room for further improvement. Moreover, the wear resistance of the rubber composition is not sufficient.

An object of one aspect of the present invention is to provide a rubber composition for a tire imparted with a steering stability during high-speed traveling, a wet performance, a sustainability of a grip performance, a wear resistance, and a low rolling resistance, which surpass the conventional levels.

SUMMARY

A rubber composition for a tire according to one aspect of the present invention includes diene-based rubber containing 50 wt % or more of styrene-butadiene rubber, wherein 0.2 to 5 parts by weight of cyclic polysulfide represented by formula (I) below, 1 to 30 parts by weight of aromatic denatured terpene resin, 20 to 80 parts by weight of silica, and 40 to 100 parts by weight of carbon black are blended relative to 100 parts by weight of the diene-based rubber, a total blending amount of the silica and the carbon black is 70 to 130 parts by weight, and a styrene content in the styrene-butadiene rubber is 36 wt % or more.

[Formula (I)]

In the formula, R represents a substituted or unsubstituted alkylene group having 2 to 18 carbon atoms, a substituted or unsubstituted oxyalkylene group having 2 to 18 carbon atoms, or an alkylene group including an aromatic ring, x represents an average number of 2 to 6, and n represents an integer of 1 to 15.

BRIEF DESCRIPTION OF THE DRAWINGS

The foregoing and other objects, features, aspects and advantages of the invention will become more apparent from the following detailed description when taken in conjunction with the accompanying drawings, in which:

FIGURE is a partial cross-sectional view of one example of a pneumatic tire.

DESCRIPTION OF EMBODIMENTS

Preferred embodiments of the present invention will be described below with reference to the accompanying drawings, in which like reference characters designate similar or identical parts throughout the several views thereof.

Hereinafter, an embodiment of the present invention will be described in detail.

A rubber composition for a tire (the rubber composition) according to the present embodiments includes diene-based rubber as a rubber component. The diene-based rubber contains 50 wt % or more of styrene-butadiene rubber. The styrene-butadiene rubber has a styrene content of 36 wt % or more. Thus, the rubber composition contains the styrene-butadiene rubber having a styrene content of 36 wt % or more. This imparts the rubber composition with improved steering stability, wet performance, and sustainability of a grip performance. The styrene content of the styrene-butadiene rubber is preferably 36 wt % or more, and more preferably 36 to 42 wt %. When the styrene content of the styrene-butadiene rubber is less than 36 wt %, the steering stability, the wet performance, and the sustainability of a grip performance are insufficient. In the present embodiment, the styrene content of the styrene-butadiene rubber is measured by infrared spectroscopic analysis (Hampton method).

The blending amount of the styrene-butadiene rubber having a styrene content of 36 wt % or more relative to 100 wt % of diene-based rubber is 50 wt % or more, and preferably 60 to 75 wt %. When the blending amount of the styrene-butadiene rubber is less than 50 wt %, the steering stability, the wet performance, and the sustainability of a grip performance are insufficient.

The rubber composition may contain other diene-based rubbers in addition to the styrene-butadiene rubber having a styrene content of 36 wt % or more. Examples of the other diene-based rubbers include natural rubber, isoprene rubber, butadiene rubber, acrylonitrile-butadiene rubber, butyl rubber, and styrene-butadiene rubber having a styrene content of less than 36 wt %. Particularly, it is preferable to use the natural rubber, the butadiene rubber, and the styrene-butadiene rubber having a styrene content of less than 36 wt %, and in particular, it is more preferable to use the styrene-butadiene rubber having a styrene content of less than 36 wt %. These diene-based rubbers may be used singly, or arbitrarily blended and used. The blending amount of the other diene-based rubbers relative to 100 wt % of diene-based rubber is 50 wt % or less, and preferably 25 to 40 wt %. When the blending amount of the other diene-based rubbers is set within such a range, a glass transition temperature of the entire diene-based rubber can be adjusted.

The rubber composition is preferably blended with silica. This improves the wet performance and decreases the rolling resistance. The blending amount of the silica relative to 100 parts by weight of diene-based rubber is 20 to 80 parts by weight, and preferably 30 to 70 parts by weight. When the blending amount of the silica is less than 20 parts by weight, the wet performance and the low rolling resistance of the rubber composition are not sufficiently improved. When the blending amount of the silica exceeds 80 parts by weight, the wear resistance of the rubber composition is insufficient. Examples of the silica to be used include silica that is blended normally with a tire tread rubber composition (e.g., wet silica, dry silica, and surface treated silica).

A silane coupling agent is preferably blended with the rubber composition, together with the silica. The silane coupling agent improves the dispersibility of silica. Thus, it is possible to further enhance the reinforcing property between the silica and the diene-based rubber. The blending amount of the silane coupling agent relative to 100 wt % of silica is preferably 3 to 15 wt %, and more preferably 5 to 10 wt %. When the blending amount of the silane coupling agent is less than 3 wt %, it is not possible to sufficiently improve the dispersibility of silica. Moreover, when the blending amount of the silane coupling agent exceeds 15 wt %, the silane coupling agents are polymerized, and thus it is not possible to obtain a desired effect.

The silane coupling agent to be used preferably includes, but is not limited to, a sulfur-containing silane coupling agent. Examples thereof include bis-(3-triethoxysilylpropyl)tetrasulfide, bis(3-triethoxysilylpropyl)disulfide, 3-trimethoxysilylpropyl benzothiazole tetrasulfide, γ-mercaptopropyl triethoxysilane, and 3-octanoylthiopropyl triethoxysilane.

As a result of carbon black being blended, the rubber composition is imparted with the improved steering stability and the wear resistance. The blending amount of the carbon black relative to 100 parts by weight of diene-based rubber is 40 to 100 parts by weight, and preferably 50 to 90 parts by weight. When the blending amount of the carbon black is less than 40 parts by weight, the steering stability and the wear resistance of the rubber composition cannot be sufficiently improved. Moreover, when the blending amount of the carbon black exceeds 100 parts by weight, the rolling resistance of the rubber composition decreases.

The total blending amount of the silica and the carbon black relative to 100 parts by weight of diene-based rubber is 70 to 130 parts by weight, and preferably 90 to 120 parts by weight. When the total blending amount of the silica and the carbon black is less than 70 parts by weight, the steering stability and the wear resistance of the rubber composition are insufficient. Moreover, when the total blending amount of the silica and the carbon black exceeds 130 parts by weight, the steering stability and the wet performance of the rubber composition decreases and the rolling resistance decreases as well.

In the carbon black used in the rubber composition, the DBP absorption is preferably 35 ml/100 g or more and less than 70 ml/100 g. pH is preferably 6.0 to 8.0. A ratio of a nitrogen adsorption specific surface area ($N_2SA$) to an iodine adsorption (IA) ($N_2SA/IA$) is preferably 1.10 or more. When the carbon black that satisfies the three colloidal characteristics is used, a balance between a value at 0° C. and that at 60° C. of tanδ (loss tangent in dynamic viscoelastic characteristic) of the rubber composition can be improved. That is, when the carbon black that satisfies the three colloidal characteristics is used, tanδ at 0° C. of the rubber composition becomes larger. As a result, the wet performance correlated with the tanδ can be improved. Moreover, since the tanδ at 60° C. becomes smaller, the heat buildup correlated with the tanδ can be made smaller. As a result, the rolling resistance of the rubber composition can be decreased. The reinforcing property to the diene-based rubber in the carbon black is lower than that of normal carbon black. Thus, the carbon black inhibits the rigidity and the hardness of the rubber composition from becoming excessive. As a result, even when the blending amount to the diene-based rubber in the carbon black increases, it is possible to inhibit a decrease of the sustainability of a grip performance or the wet performance of the rubber composition and an increase of the rolling resistance of the same.

The DBP absorption of the carbon black is preferably 35 ml/100 g or more and less than 70 ml/100 g, and more preferably 50 to 68 ml/100 g. When the DBP absorption of the carbon black is less than 35 ml/100 g, it becomes difficult to manufacture the carbon black. When the DBP absorption of the carbon black is 70 ml/100 g or more, the tanδ at 60° C. becomes high and the temperature dependency of the rubber hardness becomes large. This results in a large performance change during high-speed travelling of the tire formed by the rubber composition. Thus, the sustainability of a grip performance of the tire decreases. It is noted that the DBP absorption of the carbon black is measured in accordance with JIS K6217-4.

The pH of the carbon black is preferably 6.0 to 8.0, and more preferably 6.5 to 7.5. When the pH of the carbon black is less than 6.0, the vulcanization rate of the rubber composition decreases. As a result, the productivity of the pneumatic tire using the rubber composition decreases. When the pH of the carbon black exceeds 8.0, the vulcanization rate increases. As a result, a premature cure tends to occur easily, and a vulcanization formability decreases. Here, the pH of the carbon black is measured in accordance with JIS K6221.

In the carbon black, the ratio of a nitrogen adsorption specific surface area ($N_2SA$) to an iodine adsorption (IA) ($N_2SA/IA$) is preferably 1.10 or more, and more preferably 1.10 to 1.50. When the characteristic ratio ($N_2SA/IA$) of the carbon black is less than 1.10, the tanδ at 60° C. increases and the reinforcing property to the rubber composition decreases. As a result, the strength or the wear resistance of the rubber composition is insufficient. Here, a value of the nitrogen adsorption specific surface area ($N_2SA$) of the carbon black is measured in accordance with JIS K6217-2 and that of the iodine adsorption (IA) thereof is measured in accordance with JIS K6217-1, respectively.

With the rubber composition, cyclic polysulfide represented by the formula (I) below is blended. As a result, the rubber composition can sustain a high level of grip performance for a long period of time and have a high blow-out resistance. Moreover, the cyclic polysulfide enhances the rubber strength in a high-temperature state, of the rubber composition. Therefore, it leads to an improvement in the wear resistance of the rubber composition.

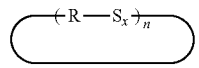

[Formula (I)]

where R represents a substituted or unsubstituted alkylene group having 2 to 18 carbon atoms, a substituted or unsubstituted oxyalkylene group having 2 to 18 carbon atoms, or an alkylene group including an aromatic ring, S represents sulfur, x is an average number of 2 to 6, and n is an integer of 1 to 15. As described above, R is an alkylene group, which may or may not have a substituent.

In the cyclic polysulfide represented by the above-described formula (I), the carbon number of R (alkylene group or oxyalkylene group) is 2 to 18, preferably 2 to 10, and more preferably 4 to 8. Examples of substituent groups for the alkylene group and the oxyalkylene group include a phenyl group, a benzyl group, a methyl group, an epoxy group, an isocyanate group, a vinyl group, and a silyl group. It is noted that x is an average number of 2 to 6, preferably an average number of 3 to 5, and more preferably an average number of 3.5 to 4.5, and n is an integer of 1 to 15, preferably 1 to 10, and more preferably 1 to 5. Such a cyclic polysulfide can be manufactured according to an ordinary method. Examples of the manufacturing method include one described in JP-A-2007-92086.

The blending amount of the cyclic polysulfide relative to 100 parts by weight of diene-based rubber in the rubber composition is 0.2 to 5 parts by weight, and preferably 1 to 4 parts by weight. When the blending amount of the cyclic polysulfide is less than 0.2 parts by weight, it is not possible to sustain a high level of grip performance for a long period of time and to improve the blow-out resistance. In this case, it is not possible to sufficiently inhibit a decrease of the wear resistance of the rubber composition. When the blending amount of the cyclic polysulfide exceeds 5 parts by weight, the processability of the rubber composition decreases.

In the rubber composition, the cyclic polysulfide represented by the above-described formula (I) acts as a vulcanizing agent. As the vulcanizing agent, the cyclic polysulfide may be used alone or with another vulcanizing agent. The other vulcanizing agent is preferably sulfur. The blending amount of the sulfur relative to 100 parts by weight of diene-based rubber is 0.1 to 5 parts by weight, and preferably 0.5 to 4 parts by weight. When the sulfur is blended, a weight ratio of the cyclic polysulfide to the sulfur (cyclic polysulfide/sulfur) is preferably 1/5 to 10/1, and more preferably 1/4 to 4/1. When the weight ratio (cyclic polysulfide/sulfur) is set within this range, it is possible to sustain the grip performance of the rubber composition at a high level for a long period of time and to improve the blow-out resistance and the wear resistance of the rubber composition.

With the rubber composition, an aromatic denatured terpene resin is blended. Therefore, it leads to an improvement in the steering stability, the wet performance, and the wear resistance of the rubber composition. The aromatic denatured terpene resin used is obtained by polymerizing terpenes such as α-pinene, β-pinene, dipentene, and limonene, with aromatic compounds such as styrene, phenol, α-methylstyrene, and vinyl toluene. The blending amount of the aromatic denatured terpene resin relative to 100 parts by weight of diene-based rubber is 1 to 30 parts by weight, and preferably 5 to 20 parts by weight. When the blending amount of the aromatic denatured terpene resin is less than 1 part by weight, it is not possible to sufficiently enhance the steering stability, wet performance, and wear resistance of the rubber composition. Moreover, when the blending amount of the aromatic denatured terpene resin exceeds 30 parts by weight, the sustainability of a grip performance and the blow-out resistance of the rubber composition decrease. Further, the wear resistance of the rubber composition deteriorates. The adhesion to the roll of the rubber composition increases, and therefore, the processability decreases. The aromatic denatured terpene resin also works as a softener. Thus, it is preferable to adjust the blending amount of other softeners such as aromatic oil according to the blending amount of the aromatic denatured terpene resin.

In the rubber composition, a vulcanization accelerator is not particularly limited. Examples of the vulcanization accelerator include a sulfenamide-based vulcanization accelerator, a guanidine-based vulcanization accelerator, a thiuram-based vulcanization accelerator, and a thiazole-based vulcanization accelerator. These vulcanization accelerators may be used singly, or a plurality of vulcanization accelerators may be combined and used. As the vulcanization accelerator, the thiuram-based vulcanization accelerator is preferably used. In particular, the thiuram-based vulcanization accelerator and the sulfenamide-based vulcanization accelerator may be combined and used. When the thiuram-based vulcanization accelerator is blended with the rubber composition, it is possible to further improve the steering stability and the sustainability of a grip performance. Examples of the thiuram-based vulcanization accelerator include tetramethylthiuram disulfide, tetraethylthiuram disulfide, tetramethylthiuram monosulfide, tetrakis(2-ethylhexyl)thiuram-disulfide, and tetrabenzylthiuram disulfide.

The blending amount of the thiuram-based vulcanization accelerator relative to 100 parts by weight of diene-based rubber is preferably 0.1 to 3 parts by weight, and more preferably 0.5 to 2.0 parts by weight. When the blending amount of the thiuram-based vulcanization accelerator is less than 0.1 parts by weight, the steering stability and the sustainability of a grip performance of the rubber composition cannot be sufficiently improved. When the blending amount of the thiuram-based vulcanization accelerator exceeds 3 parts by weight, the rubber hardness of the rubber composition becomes too high.

With the rubber composition, other inorganic fillers other than the silica and the carbon black may be blended. Examples of the other inorganic fillers include clay, calcium carbonate, aluminum hydroxide, mica, and talc. With the rubber composition, various types of additives generally used in the rubber composition, such as a vulcanization accelerator, an antioxidant, a plasticizer, and a coupling agent, may be blended. Such additives may be kneaded by a general method as a rubber composition, and then, used for vulcanization or cross-linkage. The blending amount of these additives may be a conventional general blending amount as long as the steering stability during high-speed traveling, the wet performance, the sustainability of a grip performance, the wear resistance, or the low rolling resistance is not decreased. The rubber composition can be manufactured by mixing each of the above-described components by way of well-known kneaders for rubber (e.g., a Banbury mixer, a kneader, and a roll).

The rubber composition can be appropriately used for a tread portion of a racing tire or a general high-performance tire.

FIGURE is a partial cross-sectional view of one example of a pneumatic tire for an automobile, according to the present embodiment.

This pneumatic tire includes a pair of right and left bead portions 1 and side walls 2. The pneumatic tire further includes: a tread portion 3 communicated to the both side walls 2; and a carcass layer 4.

The bead portion 1 includes a bead core 5, a bead filler 6, and a rim cushion 8. The rim cushion 8 is disposed in a portion making contact with a rim.

The carcass layer 4 is laid between the bead portions 1 and 1. A fiber cord is embedded in the carcass layer 4. The end of the carcass layer 4 is wound up to be folded from inside the tire to the outside so that the bead core 5 and the bead filler 6 are surrounded.

The tread portion 3 includes a belt layer 7. The belt layer 7 is disposed over the entire circumference of the tire outside the carcass layer 4.

The tread portion 3 of the pneumatic tire is formed by using the rubber composition for a tire. As a result, the pneumatic tire is imparted with an excellent steering stability during high-speed traveling, wet performance, sustainability of a grip performance, wear resistance, and low rolling resistance.

The rubber composition will be described with reference to Examples and Comparative Examples, below. It is noted that the technical scope of the rubber composition is not restricted by these examples.

EXAMPLES

In Examples 1 to 5 and Comparative Examples 1 to 8, 13 types of samples of the tire tread rubber composition were manufactured. Tables 1 and 2 show a blend component and its blending amount (parts by weight) in Examples and Comparative Examples. The samples in Examples and Comparative Examples were manufactured as follows: firstly, blend components other than sulfur, a vulcanization accelerator, and cyclic polysulfide were weighed. Then, the blend components were kneaded for five minutes in a 1.7-L internal Banbury mixer. Subsequently, a masterbatch was released at a temperature of 150° C. and was cooled at room temperature. The sulfur, the vulcanization accelerator, and the cyclic polysulfide were added to the masterbatch, and the resultant mixture was mixed in the 1.7-L internal Banbury mixer, as a result of which unvulcanized rubber compositions for a tire were prepared.

Thirteen types of the resultant rubber compositions were vulcanized and formed at 150° C. for 30 minutes in a predetermined shaped mold to manufacture rubber compositions (vulcanized rubber sheet) that were Examples and Comparative Examples. Then, by using methods described below, a rubber hardness evaluation, a tensile test, a tensile test after heat aging, a dynamic viscoelastic test, and a wear resistance evaluation were conducted to evaluate each rubber composition.

Rubber Hardness

The rubber hardness of each rubber composition was measured at a temperature of 20° C. by a type-A durometer in accordance with JIS K6253. The obtained results were converted to relative values when a value of Comparative Example 1 was indexed at 100, and the value was represented as "rubber hardness (20° C.)" in Tables 1 and 2. The larger the value, the higher the rubber hardness, hence superior steering stability.

Tensile Test (300% Modulus, Tensile Breaking Strength)

Each rubber composition was stamped in accordance with JIS K6251, so that a dumbbell-like No. 3 specimen was obtained. Under the condition of room temperature and a tension rate of 500 mm/minute, a 300% modulus and a tensile breaking strength of each specimen were measured. Tables 1 and 2 show the obtained results ("300% modulus" and "tensile breaking strength") by using a relative value when a value of Comparative Example 1 is indexed at 100. The larger the relative values of the "300% modulus" and the "tensile breaking strength", the higher the 300% modulus and the tensile breaking strength of the rubber composition, hence an excellent steering stability of a tire formed by such a rubber composition.

Tensile Test after Heat Aging (Modulus Change Rate after Heat Aging)

The 300% modulus measured according to the above-described method is set as an initial 300% modulus. Each rubber composition was stamped in accordance with JIS K6251, so that a dumbbell-like No. 3 specimen was obtained. Each specimen was heated in an oven at a temperature of 80° C. for one week, and thus, a state adjustment was performed. As a result, a specimen after heat aging was obtained. The 300% modulus of the specimen after heat aging was each measured under the conditions of room temperature and a tension rate of 500 mm/minute in accordance with JIS K6251.

In each specimen, a change rate of 300% modulus after heat aging relative to the initial 300% modulus was calculated. Tables 1 and 2 show calculation results ("modulus change rate after heat aging") by using a relative value when a change rate of Comparative Example 1 is indexed at 100. The smaller the value, the smaller the change rate of 300% modulus after heat aging, hence excellent sustainability of a grip performance of the rubber composition.

Dynamic Viscoelastic Test (E' at 60° C., tanδ at 0° C. and 60° C.)

The dynamic viscoelasticity of each rubber composition was measured by using a viscoelastic spectrometer made by Iwamoto Seisakusho Co., LTD., under the conditions of an elongation deformation strain rate of 10%±2% and a frequency of 20 Hz. Through this measurement, tanδ at a temperature of 0° C. and E' and tanδ at a temperature of 60° C. were evaluated. Tables 1 and 2 show the obtained results ("E' (60° C.)", "tanδ (0° C.)", and "tanδ (60° C.)") by using a relative value when a value of Comparative Example 1 is indexed at 100.

The larger the relative value of "E' (60° C.)", the larger the E' at a temperature of 60° C. of the rubber composition, hence excellent steering stability and sustainability of a grip performance of the tire formed by such a rubber composition. The larger the relative value of "tanδ (0° C.)", the larger the tanδ at a temperature of 0° C., hence excellent wet performance of the rubber composition. The smaller the relative value of "tanδ (60° C.)", the smaller the tanδ at a temperature of 60° C., hence low rolling resistance of the rubber composition. This means that the fuel consumption performance of the tire formed by such a rubber composition is excellent.

Wear Resistance

The Lambourn wear of each rubber composition was measured by using a Lambourn wear tester made by Iwamoto Seisakusho Co., LTD., in accordance with JIS K6264-2 under the conditions of: 49N load; 25% slip rate; four minutes; and room temperature. Tables 1 and 2 show the obtained results ("wear resistance") by using a relative value when a value of Comparative Example 1 is indexed at 100. The larger the value, the more excellent the wear resistance.

TABLE 1

|  |  | C. Ex. 1 | C. Ex. 2 | C. Ex. 3 | Ex. 1 | Ex. 2 | Ex. 3 |
|---|---|---|---|---|---|---|---|
| SBR1 | parts by wt. | 105.9 | 105.9 | 105.9 | 105.9 |  | 105.9 |
| SBR2 | parts by wt. | 31.6 | 31.6 | 31.6 | 31.6 | 31.6 | 31.6 |
| SBR3 | parts by wt. |  |  |  |  | 105.9 |  |
| Carbon black 1 | parts by wt. | 70 |  | 70 |  |  |  |
| Carbon black 2 | parts by wt. |  | 70 |  | 80 | 80 | 80 |
| Silica | parts by wt. | 40 | 40 | 40 | 40 | 40 | 40 |
| Silane coupling agent | parts by wt. | 3 | 3 | 3 | 3 | 3 | 3 |
| Aromatic denatured terpene resin | parts by wt. |  |  | 10 | 10 | 10 | 10 |
| Zinc oxide | parts by wt. | 3 | 3 | 3 | 3 | 3 | 3 |
| Stearic acid | parts by wt. | 2 | 2 | 2 | 2 | 2 | 2 |
| Antioxidant | parts by wt. | 3 | 3 | 3 | 3 | 3 | 3 |
| Aromatic oil | parts by wt. | 10 | 10 |  |  |  |  |
| Vulcanization accelerator 1 | parts by wt. | 2 | 2 | 2 | 2 | 2 | 2 |
| Vulcanization accelerator 2 | parts by wt. | 1 | 1 | 1 |  |  |  |
| Vulcanization accelerator 3 | parts by wt. |  |  |  |  |  | 1 |
| Cyclic polysulphide | parts by wt. |  |  |  | 4 | 4 | 4 |
| Sulfur | parts by wt. | 2 | 2 | 2 |  |  |  |
| Rubber hardness (20° C.) | index | 100 | 92 | 100 | 100 | 102 | 100 |
| 300% modulus | index | 100 | 88 | 103 | 105 | 107 | 101 |
| Tensile breaking strength | index | 100 | 100 | 101 | 106 | 106 | 102 |
| E' (60° C.) | index | 100 | 80 | 103 | 110 | 111 | 103 |
| tanδ (0° C.) | index | 100 | 106 | 105 | 107 | 109 | 115 |
| tanδ (60° C.) | index | 100 | 86 | 102 | 93 | 95 | 85 |
| Modulus change rate after heat aging | index | 100 | 100 | 99 | 86 | 88 | 91 |
| Wear resistance | index | 100 | 95 | 102 | 102 | 100 | 105 |

TABLE 2

|  |  | Ex. 4 | Ex. 5 | C. Ex. 4 | C. Ex. 5 | C. Ex. 6 | C. Ex. 7 | C. Ex. 8 |
|---|---|---|---|---|---|---|---|---|
| SBR1 | parts by wt. | 105.9 | 105.9 |  | 61.9 | 105.9 | 105.9 | 105.9 |
| SBR2 | parts by wt. | 31.6 | 31.6 | 31.6 | 75.6 | 31.6 | 31.6 | 31.6 |
| SBR4 | parts by wt. |  |  | 105.9 |  |  |  |  |
| Carbon black 1 | parts by wt. |  | 40 |  |  |  |  |  |
| Carbon black 2 | parts by wt. |  |  | 80 | 80 | 40 | 110 | 80 |
| Carbon black 3 | parts by wt. | 80 |  |  |  |  |  |  |
| Silica | parts by wt. | 40 | 40 | 40 | 40 | 90 | 20 | 60 |
| Silane coupling agent | parts by wt. | 3 | 3 | 3 | 3 | 6.75 | 1.5 | 4.5 |
| Aromatic denatured terpene resin | parts by wt. | 10 | 10 | 10 | 10 | 10 | 10 | 10 |
| Zinc oxide | parts by wt. | 3 | 3 | 3 | 3 | 3 | 3 | 3 |
| Stearic acid | parts by wt. | 2 | 2 | 2 | 2 | 2 | 2 | 2 |
| Antioxidant | parts by wt. | 3 | 3 | 3 | 3 | 3 | 3 | 3 |
| Vulcanization accelerator 1 | parts by wt. | 2 | 2 | 2 | 2 | 2 | 2 | 2 |
| Cyclic polysulphide | parts by wt. | 4 | 4 | 4 | 4 | 4 | 4 | 4 |
| Rubber hardness (20° C.) | index | 100 | 100 | 98 | 95 | 103 | 95 | 103 |
| 300% modulus | index | 102 | 105 | 99 | 82 | 107 | 93 | 101 |
| Tensile breaking strength | index | 103 | 106 | 95 | 81 | 107 | 89 | 95 |
| E' (60° C.) | index | 104 | 105 | 98 | 83 | 112 | 93 | 102 |
| tanδ (0° C.) | index | 114 | 108 | 102 | 91 | 107 | 88 | 85 |
| tanδ (60° C.) | index | 85 | 100 | 95 | 89 | 100 | 101 | 110 |
| Modulus change rate after heat aging | index | 92 | 90 | 92 | 95 | 93 | 101 | 103 |
| Wear resistance | index | 104 | 101 | 101 | 115 | 87 | 103 | 98 |

Characteristics of the raw materials used for Examples 1 to 5 and Comparative Examples 1 to 8 are shown below.

SBR (styrene-butadiene rubber) 1: 36 wt % of styrene content, E581 manufactured by Asahi Kasei Chemicals Corporation, an oil-extended product obtained by adding 37.5 parts by weight of oil to 100 parts by weight of rubber;

SBR (styrene-butadiene rubber) 2: 18 wt % of styrene content, Tufden 1834 manufactured by Asahi Kasei Chemicals Corporation, an oil-extended product obtained by adding 37.5 parts by weight of oil to 100 parts by weight of rubber;

SBR (styrene-butadiene rubber) 3: 39 wt % of styrene content, NIPOL NS522 manufactured by Zeon Corporation, an oil-extended product obtained by adding 37.5 parts by weight of oil to 100 parts by weight of rubber;

SBR (styrene-butadiene rubber) 4: 25 wt % of styrene content, NIPOL NS460 manufactured by Zeon Corporation, an oil-extended product obtained by adding 37.5 parts by weight of oil to 100 parts by weight of rubber;

Carbon black 1: SEAST 9M manufactured by Tokai Carbon Co., Ltd., DBP absorption=130 ml/100 g, pH=7.0, nitrogen adsorption specific surface area ($N_2SA$)=140 $m^2/g$, iodine adsorption (IA)=165 mg/g, ratio ($N_2SA$/IA)=0.85;

Carbon black 2: sample carbon black manufactured by the below-described method, DBP absorption=65 ml/100 g, pH=7.0, nitrogen adsorption specific surface area ($N_2SA$)= 114 $m^2/g$, iodine adsorption (IA)=88 mg/g, ratio $N_2SA$/IA=1.25; and Carbon black 3: sample carbon black manufactured by the below-described method, DBP absorption=67 ml/100 g, pH=6.0, nitrogen adsorption specific surface area ($N_2SA$)=94 $m^2/g$, iodine adsorption (IA)=66 mg/g, ratio $N_2SA$/IA=1.42.

Manufacture of Carbon Blacks 2 and 3

An oil furnace was used, generation conditions were changed, and then, the carbon blacks 2 and 3 having a unique characteristic were obtained. In the oil furnace, a combustion chamber (diameter 400 mm, length 500 mm) is equipped at the furnace head. The combustion chamber is equipped with a tangential air supply port, a combustion burner attached in a furnace shaft direction, and a raw-oil spray nozzle. The oil furnace is provided further with a front-stage narrower-diameter reaction chamber (diameter 180 mm, length 500 mm) coaxially joined to the combustion chamber, a rear-stage reaction chamber (diameter 150 mm, length 1000 mm), and a wider-diameter reaction chamber (diameter 300 mm) joined thereto.

Characteristics of the other raw materials are shown below.

Silica: Zeosil 1165 MP manufactured by Rhodia;

Silane coupling agent: Si69 manufactured by Evonik Degussa Japan Co., Ltd.;

Aromatic denatured terpene resin: YS Resin TO-125 manufactured by YASUHARA CHEMICAL Co., Ltd.;

Zinc oxide: three kinds of zinc oxides manufactured by Seido Chemical Industry Co., Ltd.;

Stearic acid: beads stearic acid manufactured by NOF Corporation;

Antioxidant: 6PPD manufactured by Flexsys;

Aromatic oil: Extract No. 4S manufactured by Showa Shell Sekiyu K.K.;

Sulfur: Gold Flower brand oil-containing sulfur powder manufactured by Tsurumi Chemical Industry Co., Ltd.;

Vulcanization accelerator 1: sulfenamide-based vulcanization accelerator, Nocceler CZ-G manufactured by Ouchi Shinko Chemical Industrial Co. Ltd.;

Vulcanization accelerator 2: guanidine-based vulcanization accelerator, Soxinol D-G manufactured by Sumitomo Chemical Co., Ltd.;

Vulcanization accelerator 3: thiuram-based vulcanization accelerator, Nocceler TOT-N manufactured by Ouchi Shinko Chemical Industrial Co. Ltd.; and Cyclic polysulfide: cyclic polysulfide according to formula (I), where R=$(CH_2)_2O(CH_2)_2$, X(average)=4, and n=2 to 3.

Here, a method of manufacturing the cyclic polysulfide will be described. Firstly, 1.98 g (0.02 mol) of 1,2-dichloroethane and 1197 g (2 mol) of a 30% aqueous sodium polysulfide ($Na_2S_4$) solution are added to toluene (500 g). This is followed by injecting 0.64 g (0.1 mol) of tetrabutylammonium bromide into the resultant solution. Then, the solution was allowed to react at 50° C. for two hours. The reaction temperature is increased to 90° C., after which a solution obtained by dissolving 311 g (1.8 mol) of dichloroethyl formal into 300 g of toluene was added dropwise to the solution over one hour. Then, the resultant solution was further allowed to react for five hours. After the reaction, the organic layer was separated from the solution, and the solution was condensed at 90° C. under a reduced pressure, as a result of which 405 g of cyclic polysulfide having the above-described chemical structure was obtained (96.9% of yield).

As is obvious from Tables 1 and 2, the rubber compositions for a tire of Examples 1 to 5 are imparted with characteristics respectively correlated with the steering stability during high-speed traveling, the wet performance, the sustainability of a grip performance, and the low rolling resistance; and the wear resistance, which surpass the conventional levels.

As is obvious from Table 1, the cyclic polysulfide is not blended with the rubber composition of Comparative Example 2. Thus, the characteristics respectively correlated with the steering stability and the sustainability of a grip performance, and the wear resistance of Comparative Example 2 are poor. The rubber composition of Comparative Example 3, which is obtained by blending the aromatic denatured terpene resin with Comparative Example 1, does not contain the cyclic polysulfide. Thus, although the characteristics respectively correlated with the steering stability and the sustainability of a grip performance, and the wear resistance of Comparative Example 3 are improved, the rolling resistance (tanδ at 60° C.) is poor.

As is obvious from Table 2, the styrene-butadiene rubber having a styrene content of 36 wt % or more is not blended with the rubber composition of Comparative Example 4. Thus, in Comparative Example 4, the breaking strength is low, and the steering stability and the sustainability of a grip performance are poor. In the rubber composition of Comparative Example 5, the blending amount of the styrene-butadiene rubber having a styrene content of 36 wt % or more relative to 100 wt % of diene-based rubber is less than 50 wt %. Thus, in Comparative Example 5, the 300% modulus, the breaking strength, E' (60° C.), and tanδ (0° C.) are low. As a result, in Comparative Example 5, the steering stability, the wet performance, and the sustainability of a grip performance are poor. In the rubber composition of Comparative Example 6, the blending amount of the silica exceeds 80 parts by weight. Thus, the wear resistance is poor. In the rubber composition of Comparative Example 7, the blending amount of the carbon black 2 exceeds 100 parts by weight, and besides, the blending amount of the silica (20 parts by weight) is small. Thus, in Comparative Example 7, the 300% modulus, the breaking strength, E' (60° C.), and tanδ (0° C.) are lower as compared to Example 1. As a result, the steering stability, the wet performance, and the sustainability of a grip performance are poor. In the rubber composition of Comparative Example 8, the total blending amount of the carbon black and the silica exceeds 130 parts by weight. Thus, in Comparative Example 8, the breaking strength and tanδ (0° C.) are low, and as a result, the steering stability and the wet performance are poor. Moreover, in Comparative Example 8, tanδ (60° C.) is large, and thus, the rolling resistance is also poor.

As described above, the rubber composition for a tire according to one aspect of the present invention includes diene-based rubber containing 50 wt % or more of styrene-butadiene rubber having a styrene content of 36 wt % or more. In the rubber composition, the diene-based rubber is blended with 0.2 to 5 parts by weight of cyclic polysulfide represented by the formula (I), 1 to 30 parts by weight of aromatic denatured terpene resin, 20 to 80 parts by weight of silica, and 40 to 100 parts by weight of carbon black relative to 100 parts by weight of the diene-based rubber. Further, the total blending amount of the silica and the carbon black is 70 to 130 parts by weight. As a result, the rubber composition for a tire is capable of sustaining and improving a steering stability, a wet performance, a wear resistance, and a low rolling resistance. Moreover, when the cyclic polysulfide represented by the formula (I) is blended, the rubber composition for a tire is capable of sustaining a grip performance for a long period of time, and is imparted with an excellent blow-out resistance. Further, the rubber composition for a tire, which has a high rubber strength in a high-temperature state, can be imparted with a much improved wear resistance. As a result, the rubber composition for a tire can be imparted with a steering stability during high-speed traveling, a wet performance, a sustainability of a grip performance, a wear resistance, and a low rolling resistance, which surpass the conventional levels.

The carbon black preferably has a DBP absorption of 35 ml/100 g or more and less than 70 ml/100 g, a pH of 6.0 to 8.0, and a ratio of a nitrogen adsorption specific surface area ($N_2SA$) to an iodine adsorption (IA) ($N_2SA/IA$) of 1.10 or more. When such carbon black is used, it is possible to further improve the wet performance and the low rolling resistance of the rubber composition for a tire.

It is preferable that 0.1 to 3 parts by weight of thiuram-based vulcanization accelerator is blended relative to 100 parts by weight of diene-based rubber. As a result, it is possible to further improve the steering stability and the sustainability of a grip performance of the rubber composition for a tire.

The pneumatic tire including a tread portion containing the rubber composition for a tire has an excellent steering stability during high-speed traveling, wet performance, sustainability of a grip performance, wear resistance, and low rolling resistance.

While the invention has been illustrated and described in detail, the foregoing description is in all aspects illustrative and not restrictive. It is therefore understood that numerous modifications and variations can be devised without departing from the spirit and scope of the invention.

What is claimed is:

1. A rubber composition for a tire comprising diene-based rubber containing 50 wt % or more of styrene-butadiene rubber, wherein
   0.2 to 5 parts by weight of cyclic polysulfide represented by formula (I) below, 1 to 30 parts by weight of aromatic denatured terpene resin, 20 to 80 parts by weight of silica, and 40 to 100 parts by weight of carbon black are blended relative to 100 parts by weight of the diene-based rubber,
   a total blending amount of the silica and the carbon black is 70 to 130 parts by weight,
   a styrene content in the styrene-butadiene rubber is 36 wt % to 42 wt %, and
   the carbon black has a DBP absorption of 35 ml/100 g or more and less than 70 ml/100 g, a pH of 6.0 to 8.0, and a ratio of a nitrogen adsorption specific surface area ($N_2SA$) to an iodine adsorption (IA) ($N_2SA/IA$) of 1.10 or more,

[Formula (I)]

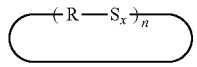

where R represents a substituted or unsubstituted alkylene group having 4 to 8 carbon atoms, or a substituted or unsubstituted oxyalkylene group having 4 to 8 carbon atoms, and x represents an average number of 3 to 5, and n represents an integer of 1 to 5.

2. The rubber composition for a tire according to claim 1, wherein 0.1 to 3 parts by weight of thiuram-based vulcanization accelerator is blended relative to 100 parts by weight of the diene-based rubber.

3. A pneumatic tire comprising a tread portion containing the rubber composition for a tire according to claim 1.

4. A pneumatic tire comprising a tread portion containing the rubber composition for a tire according to claim 3.

* * * * *